United States Patent
Hyun et al.

(10) Patent No.: US 8,323,940 B2
(45) Date of Patent: Dec. 4, 2012

(54) AIR CLEANING FILTER COMPRISING FORMALDEHYDE DEHYDROGENASE AND PROCESS FOR PRODUCING THE SAME

(75) Inventors: Ok Chun Hyun, Changwon-si (KR); Sung Hwa Lee, Changwon-si (KR); Jae Soo Jang, Changwon-si (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 12/452,475

(22) PCT Filed: Jul. 11, 2008

(86) PCT No.: PCT/KR2008/004104
§ 371 (c)(1),
(2), (4) Date: Jan. 4, 2010

(87) PCT Pub. No.: WO2009/133990
PCT Pub. Date: Nov. 5, 2009

(65) Prior Publication Data
US 2010/0120114 A1    May 13, 2010

(30) Foreign Application Priority Data
Apr. 30, 2008   (KR) .................. 10-2008-0040151

(51) Int. Cl.
*C12N 11/14*   (2006.01)
(52) U.S. Cl. ....................................... 435/176
(58) Field of Classification Search .................. 435/176
See application file for complete search history.

(56) References Cited

FOREIGN PATENT DOCUMENTS

| | | |
|---|---|---|
| CN | 1765467 | 5/2006 |
| JP | 05-042000 | 2/1993 |
| JP | 11-197691 | 7/1999 |
| JP | 2000-225000 | 8/2000 |
| JP | 2004-222845 | 8/2004 |
| KR | 1995-0003185 | 1/1995 |
| KR | 1997-0061940 | 9/1997 |
| KR | 10-1999-0075099 | 10/1999 |

OTHER PUBLICATIONS

Yamaguchi et al. 2003; Formaldehyde degradation filter via recombinant *e. coli* enzyme. IEEE, pp. 106-107.*

* cited by examiner

*Primary Examiner* — Karen Cochrane Carlson
(74) *Attorney, Agent, or Firm* — McKenna Long & Aldridge LLP

(57) ABSTRACT

Disclosed are a formaldehyde dehydrogenase-containing air cleaning filter, and a method for manufacturing the same. The method includes coating a carrier with formaldehyde dehydrogenase to immobilize the formaldehyde dehydrogenase thereon. Alternatively, the method includes coating a carrier with a coating solution, and drying the carrier, wherein the coating solution comprises a metal selected from the group consisting of zinc, gold, silver, copper, platinum and combinations thereof, a formaldehyde dehydrogenase, a polyphenol-based compound, a binder selected from the group consisting of silicon-modified acrylic resins, urethane resins, acrylic resins and silicon resins, and water or alcohol. Accordingly, the air cleaning filter wherein a carrier is coated with formaldehyde dehydrogenase, manufactured by the method, is capable of efficiently removing VOCs, in particular, formaldehyde, present in air.

8 Claims, 2 Drawing Sheets

AIR CLEANING FILTER COMPRISING FORMALDEHYDE DEHYDROGENASE AND PROCESS FOR PRODUCING THE SAME

This application is a National Phase entry of PCT Application No. PCT/KR2008/004104, filed Jul. 11, 2008, and claims the benefit of Korean Patent Application No. 10-2008-0040151, filed Apr. 30, 2008, the above-identified applications are incorporated by reference herein in their entireties.

TECHNICAL FIELD

The present invention relates to an air cleaning filter. More particularly, the present invention relates to a formaldehyde dehydrogenase-containing air cleaning filter wherein a carrier for an air cleaning filter is coated with formaldehyde dehydrogenase to efficiently remove formaldehyde present in air, and a method for manufacturing the air cleaning filter.

BACKGROUND ART

In recent years, increased interest in sick house syndrome has brought about the development of a variety of techniques for efficiently removing major indoor air pollutants including particulates, mists, gases and volatile organic compounds (VOCs). However, these techniques are mostly focused on techniques employing photo-catalysts or ventilators. However, to date, no satisfactory method capable of efficiently removing indoor air pollutants has been introduced. In addition, of specific harmful substances that are released into the indoor air of domestic workplaces and new buildings, VOCs and formaldehyde are presumed to exceed acceptable concentration levels by 3 to 5 times. These harmful substances, which are continuously generated, are known to take at least one to two years to reach acceptable levels.

There are several methods for removing formaldehyde-containing indoor harmful substances, namely, oxidation/decomposition using photo-catalysts, adsorption using deodorizers or chemical solvents, and ventilation employing using ventilation systems. The oxidation/decomposition method using photo-catalysts is known to exhibit semi-permanent effects even after a single treatment. However, the oxidation/decomposition method has disadvantages of involving high process costs and taking a long time to degrade formaldehyde.

In addition, the adsorption method is disadvantageous in that chemical solvents or deodorizers must be directly used, and harmful substances and odors can be neutralized, but these effects are only temporary. Furthermore, the ventilation method induces a change of indoor air using a ventilation system, which suffers from the disadvantages of the difficulty of installing ventilation systems in apartments and high installation costs.

Meanwhile, in recent years, there has become known the ability of microorganisms to degrade VOCs including formaldehyde (referred to as 뱀 iodegradation? that are reported to be major indoor environmental contaminants and harmful to human body. Examples of these microorganisms include bacteria such as *Pseudomonas putida*, *Rhodobacter* sp., and *Alcaligenes* sp. and yeasts such as *Hansenula* sp.

These microorganisms are generally grown by using harmful substances as substrates necessary for development or degrading the harmful substances with enzymes created by the microorganisms. In particular, when formaldehyde is degraded using microorganisms, it is degraded by formaldehyde dehydrogenase to produce formate and carbon dioxide ($CO_2$), which cause no air pollution and are harmless to human body.

DISCLOSURE

Technical Problem

An object of the present invention devised to solve the problem lies on an air cleaning filter capable of efficiently and continuously removing VOCs, in particular, formaldehyde, present in air using formaldehyde dehydrogenase.

Another object of the present invention devised to solve the problem lies on a method for manufacturing an air cleaning filter capable of removing VOCs, in particular, formaldehyde, present in air by coating a carrier with the formaldehyde dehydrogenase.

Technical Solution

The object of the present invention can be achieved by providing an air cleaning filter comprising formaldehyde dehydrogenase wherein a carrier is coated with formaldehyde dehydrogenase.

In another aspect of the present invention, provided herein is a method for manufacturing an air cleaning filter comprising formaldehyde dehydrogenase, comprising coating formaldehyde dehydrogenase on a carrier to immobilize the formaldehyde dehydrogenase thereon.

Optionally, the method for manufacturing an air cleaning filter comprises coating a carrier with a coating solution and drying the carrier, wherein the coating solution comprises: a metal selected from the group consisting of gold, zinc, silver, copper, platinum and combinations thereof; a formaldehyde dehydrogenase; a binder selected from the group consisting of silicon-modified acrylic resins, urethane resins, acrylic resins and silicon resins; a polyphenol-based compound; and water or alcohol.

Any carrier can be used in the present invention without particular limitation of the type, shape, size and preparation methods thereof so long as it can function as an air cleaning filter. Examples of useful carriers include: fibers such as glass fibers, ion-exchange fibers, cellulose fibers, asbestos fibers, organic fibers and inorganic fibers; metals such as zinc, copper or aluminum; and plastics. These carrier materials may be utilized in a variety of applications according to their properties.

In addition, the shape of the carrier may be suitably varied according to the shape of the air cleaning filter that may be used without being particularly limited to honeycombs, particles, nets, filter papers, puffs, meshes, plates and foams, etc.

The air cleaning filter according to the present invention may be used as a deodorizing filter e.g. activated carbon filters for home appliances including refrigerators and air conditioners, a heap filter and an air cleaning filter in automobiles, or may be used in conjunction with the same.

Any formaldehyde dehydrogenase can be used in the present invention without limitation so long as it is known in the art. Examples of useful formaldehyde dehydrogenases include *Pseudomonas putida*, *Rhodobacter* sp., *Alcaligenes* sp. and *Hansenula* sp. The formaldehyde dehydrogenase may be obtained by direct extraction from these microorganisms or by purchasing identified and commercially available products. The formaldehyde dehydrogenase may be used in any phase without particular limitation. Preferred is *Alcaligenes* sp. More preferred is *Alcaligenes* sp. FA2-4. For example, the formaldehyde dehydrogenase may be selected from the group consisting of *Alcaligenes* sp. viable bacteria, non-viable bacteria, GN non-viable bacteria, coenzymes and combinations thereof.

According to the present invention, the method for manufacturing the formaldehyde dehydrogenase-coated air cleaning filter comprises coating formaldehyde dehydrogenase on a carrier to immobilize the formaldehyde dehydrogenase thereon.

Optionally, the method for manufacturing the air cleaning filter may comprise spraying a coating solution onto a carrier or dipping the carrier in the coating solution, wherein the coating solution comprises: formaldehyde dehydrogenase; a binder selected from the group consisting of silicon-modified acrylic resins, urethane resins, acrylic resins and silicon resins; a metal selected from the group consisting of zinc, gold, silver, copper, platinum and combinations thereof; a polyphenol-based compound; and water or alcohol. The polyphenol-based compound is a polyhydric phenol represented by the following Formula, which may be extracted from teas including green tea, oolong tea and Persimmon leaf tea, and plants including apples, grape seeds, black beans and cacao, and exhibits an antioxidant effect.

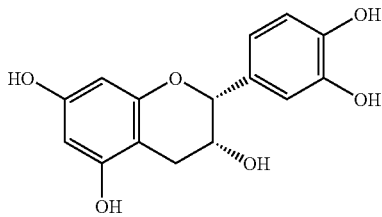

That is, the formaldehyde dehydrogenase-coated air cleaning filter is manufactured by directly coating a carrier with formaldehyde dehydrogenase, or by preparing a formaldehyde dehydrogenase-containing coating solution and coating the carrier with the solution via dipping, spraying, etc. The step of coating the carrier with the formaldehyde dehydrogenase to immobilize formaldehyde dehydrogenase thereon may be carried out in accordance with a method well-known in the art. If necessary, formaldehyde dehydrogenase may be varied in the form suitable for coating, depending on characteristics of the carrier. The immobilization of the formaldehyde dehydrogenase on the carrier may be carried out using a suitable chemical or physical immobilization technique.

In another embodiment, the method for manufacturing the air cleaning filter by coating formaldehyde dehydrogenase on the carrier comprises: mixing formaldehyde dehydrogenase with a binder selected from silicon-modified acrylic resins, urethane resins, acrylic resins and silicon resins, a metal such as gold, silver, zinc, copper or platinum, a polyphenol-based compound, and water or alcohol; and coating the surfaces of carriers for air cleaning filter applications with the coating solution via spraying or dipping. The preparation method of the coating solution is not particularly limited so long as the formaldehyde dehydrogenase is mixed with the polyphenol-based compound, the binder and the metal so that the carrier surfaces can be coated with the formaldehyde dehydrogenase. Preferably, in terms of mixability and coatability, the coating solution comprises 1 to 3% by weight of the binder, 1 to 5% by weight of the polyphenol-based compound, 0.001 to 0.003% by weight of the metal and the remaining weight percent of water.

Meanwhile, the method may further comprise, prior to coating the carrier with formaldehyde dehydrogenase, washing the carrier with a suitable cleaning solution, or drying the carrier by thermal treatment. In the case of the carrier such as a metal, it is preferable to remove oils adhered to the carrier surface during the preparation or storage of the carrier. When the carrier is dried, drying time and drying temperature may be varied depending on the shape, type and size of carrier used. In addition, the method may further comprise, after coating the carrier with formaldehyde dehydrogenase, drying the coated carrier.

The air cleaning filter thus manufactured is cut to a desired size and then used as an air cleaning filter for air cleaning equipment. In addition, the air cleaning filter may be used singly or in combination with conventional air cleaning filters or deodorizing filters. The air cleaning filter may be widely utilized in a variety of applications including air cleaning systems for home or business use, automobiles, air conditioners and home appliances.

Advantageous Effects

According to the present invention, the formaldehyde dehydrogenase-coated air cleaning filter can efficiently and continuously remove VOCs, in particular, formaldehyde, present in air.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
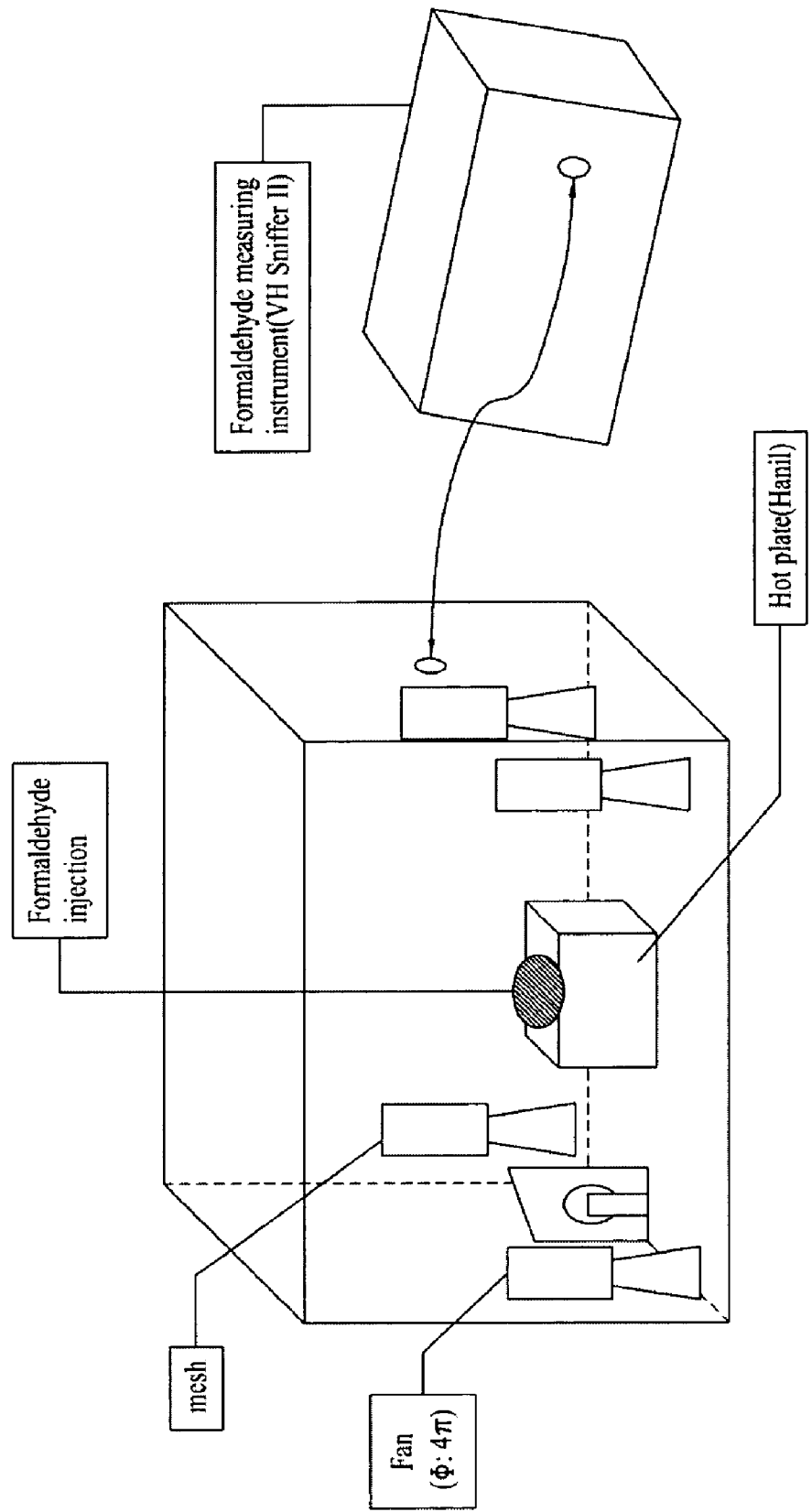
FIG. 1 is a schematic view of experimental equipment for formaldehyde-removal capacity experiments.

The present invention will now be described in further detail with reference to the following examples. These examples are for illustrative purposes only and are not intended to limit the scope of the present invention.

Examples

1. Culture of *Alcaligenes* sp. FA2-4 and Preparation of Bacteria

A. Culture of *Alcaligenes* sp. FA2-4

In order to mass-culture *Alcaligenes* sp. FA2-4, a medium for proliferating formaldehyde-degradation bacteria (10 g of peptone, 5 g of a beef extract, 1 g of $K_2HPO_4$, 5 g of NaCl, 1 g of glucose and 1 mL of trace elements (0.5 g of $B(OH)_3$, 0.04 g of $CuSO_4?H_2O$, 0.2 g of $FeCl_3?H_2O$, and 0.04 g of $ZnSO_4$롤$_2O/L$)) was dissolved in 1 L of distilled water, and sterile-filtered formaldehyde was added thereto to prepare 5.4 L of a culture medium (formaldehyde concentration: 0.04%). Then, 600 mL of the culture medium was aliquoted to 1 L erlenmeyer flasks, which were then inoculated with *Alcaligenes* sp. FA2-4. After inoculation, *Alcaligenes* sp. FA2-4 was cultured in a shaking incubator at 30킬 for 3 days with stirring at a rate of 100 rpm.

B. Preparation of Bacteria (1) Viable Bacteria, Von-Viable Bacteria and GN Non-Viable Bacteria The *Alcaligenes* sp. FA2-4 culture solution thus obtained was centrifuged at 2,500 rpm for 20 minutes, washed with a 10 mM phosphate buffer (pH 7.0) and then re-suspended in 20 mL of the buffer. After 1 mM EDTA was added to the suspension, the resulting mixture was vortexed for 10 minutes, washed with the same buffer, re-suspended in the 10 mM phosphate buffer (50 mL, pH 7.0) and then freeze-stored at −80갮 (viable bacteria).

Meanwhile, the frozen bacteria were thawed, plated on a petri dish and lyophilized in a freeze-drier for 3 days (non-viable bacteria).

Meanwhile, prior to lyophilizing the frozen bacteria in a freeze-drier, NAD (2.5 mM) and glutathione (2 mM) were added as coenzymes to the bacteria (GN non-viable bacteria).

(2) Coenzyme Solution

The *Alcaligenes* sp. FA2-4 culture solution thus obtained was centrifuged at 2,500 rpm for 20 minutes, washed with a 10 mM phosphate buffer (pH 7.0) and then re-suspended in 20 mL of the buffer. After 1 mM EDTA was added to the suspension, the resulting mixture was vortexed for 10 minutes, washed with the same buffer, and re-suspended in the 10 mM phosphate buffer (50 mL, pH 7.0). Then, the bacteria were lysed (coenzyme solution).

2. Manufacture of Formaldehyde Dehydrogenase-Coated Air Cleaning Filter

An activated carbon filter as a carrier was washed and prepared.

Separately, after viable bacteria thus obtained in Section 1 were thawed, 1 mL of bacterial suspension was homogeneously mixed with 4 mL of an immobilizing agent (a 5% dilute of silicon-modified epoxy available from NGETech Inc.). 40 mg of the non-viable bacteria and 40 mg of GN non-viable bacteria were completely suspended in 5 mL of the immobilizing agent with a micropipette. Meanwhile, 1 mL of the coenzyme solution was completely suspended in 4 mL of the immobilizing agent with a micropipette.

The mesh (7 cm×7 cm) was placed in a petri dish, immersed in the viable, non-viable and GN non-viable bacteria and the enzyme solution separately prepared, and then dried. Such a series of processes was repeated three or six times (coenzyme solution was repeated three times). As a result, four formaldehyde dehydrogenase-coated activated carbon deodorizing filters I were obtained.

Separately, 1 mL of the coenzyme solution was mixed with 5 mg of a silicon-modified acrylic binder, 1 mg of zinc, 100 mg of a polyphenol-based compound and 93.9 mL of water to prepare a formaldehyde dehydrogenase-containing coating solution. Then, the coating solution was coated onto the activated carbon deodorizing filter via a spray method. As a result, a formaldehyde dehydrogenase-coated activated carbon deodorizing filter II was obtained.

3. Experimental Example

Experimental equipment shown in FIG. 1 was used to measure the formaldehyde removal capability of the air cleaning filter thus obtained. More specifically, the experimental equipment was prepared as follows. A fan was placed and rotated in a chamber (33?3?3 cm) for a gas-phase experiment, and a hot plate for formaldehyde evaporation was placed therein. The chamber was connected to a formaldehyde measuring instrument (VH Sniffer II) through a tube.

The four activated carbon deodorizing filters I and the activated carbon deodorizing filter II were fixed at the edges of the chamber with the use of a nipper such that the filters were arranged in the same direction.

First, an aluminum dish was placed on the hot plate, and 0.4 mL of the 0.4% formaldehyde dilute was seeded on the aluminum dish and then completely evaporated. The formaldehyde dilute used herein was prepared immediately before the experiment. The diluted stock solution was used while refrigerated. Immediately after evaporation of the formaldehyde solution was completed, an initial formaldehyde level was measured with the formaldehyde measurement equipment and variation in formaldehyde concentration was measured at intervals of 10 minutes. The results thus obtained are shown in FIG. 2.

Figure 2:
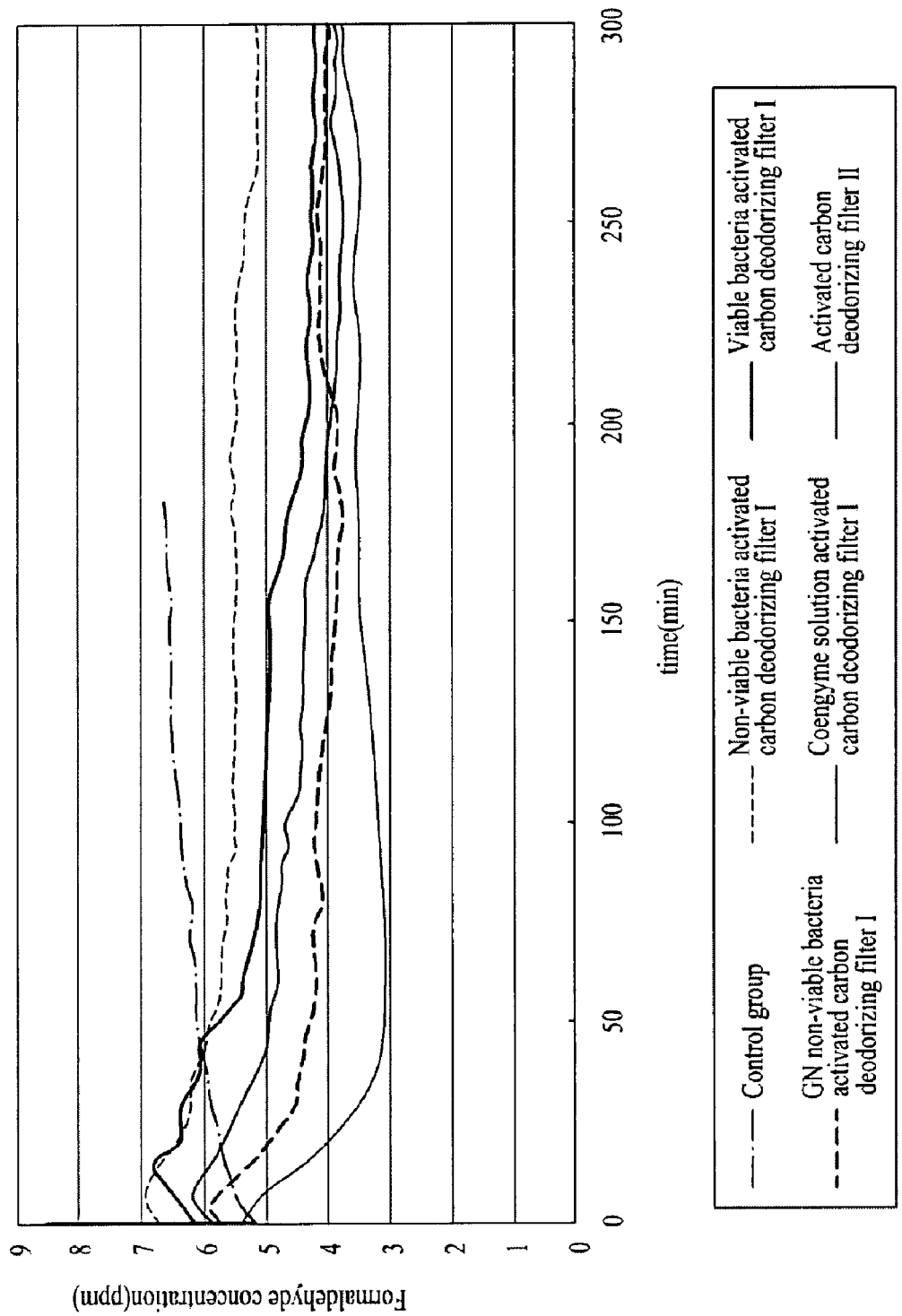
FIG. 2 is a graph showing formaldehyde-removal capacity of respective filters, as a function of concentration variation with the passage of time.

As can be seen from the results of FIG. 2, the formaldehyde dehydrogenase-containing air cleaning filter according to the present invention exhibits considerably improved and continuous formaldehyde removal capability, as compared to activated carbon filters using no formaldehyde dehydrogenase.

INDUSTRIAL APPLICABILITY

As apparent from the afore-going, the air cleaning filter of the present invention is coated with formaldehyde dehydrogenase, thus exhibiting considerable improvement in formaldehyde removal capability.

The invention claimed is:

1. An air cleaning filter wherein formaldehyde dehydrogenase is coated onto a carrier, and the formaldehyde dehydrogenase is *Alcaligenes* sp.

2. The air cleaning filter according to claim 1, wherein the formaldehyde dehydrogenase is *Alcaligenes* sp. FA2-4.

3. The air cleaning filter according to claim 1, wherein the carrier is selected from the group consisting of glass fibers, ion-exchange fibers, cellulose fibers, asbestos fibers, organic fibers and inorganic fibers.

4. The air cleaning filter according to claim 1, wherein the carrier is a metal or a plastic.

5. The air cleaning filter according to claim 1, wherein the carrier has a honeycomb, particle, net, filter paper, puff, mesh, plate or foam shape.

6. The air cleaning filter according to claim 1, wherein the carrier is an activated carbon deodorizing filter.

7. A method for manufacturing the air cleaning filter according to any one of claims 1-6 and 2, comprising coating formaldehyde dehydrogenase onto a carrier to immobilize the formaldehyde dehydrogenase thereon.

8. A method for manufacturing the air cleaning filter according to any one of claims 1-6 and 2, comprising:
 coating a carrier with a coating solution; and
 drying the carrier, wherein the coating solution comprises:
 a metal selected from the group consisting of zinc, gold, silver, copper, platinum and combinations thereof;
 a formaldehyde dehydrogenase;
 a polyphenol-based compound;
 a binder selected from the group consisting of silicon-modified acrylic resins, urethane resins, acrylic resins and silicon resins; and
 water or alcohol.

\* \* \* \* \*